No. 794,631. Patented July 11, 1905

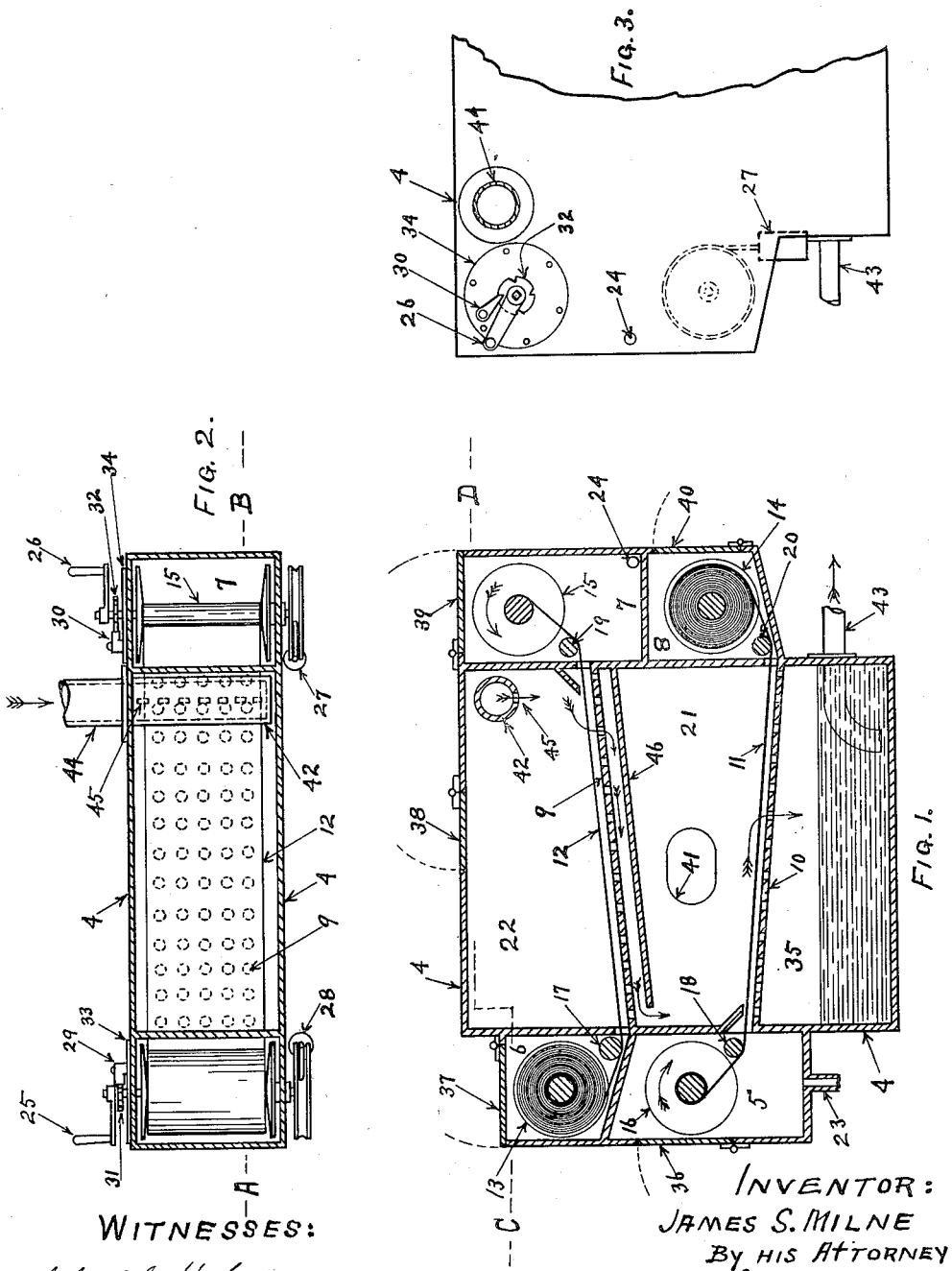

UNITED STATES PATENT OFFICE.

JAMES S. MILNE, OF CAMDEN, NEW JERSEY.

FILTERING APPARATUS.

SPECIFICATION forming part of Letters Patent No. 794,631, dated July 11, 1905.

Application filed January 26, 1905. Serial No. 242,785.

*To all whom it may concern:*

Be it known that I, JAMES S. MILNE, a citizen of the United States, and a resident of the city and county of Camden and State of New Jersey, have invented certain new and useful Improvements in Filtering Apparatus, of which the following is a specification.

My invention relates to that class of filters used for purifying water, and especially for extracting the oil and other impurities from the water of condensation from steam-engine exhausts, so as to enable the use of such water over again as feed-water to steam-boilers; and it consists in the use of one or more movable filter-beds composed of towel-crash or other woven fabric spread out, preferably under tension, in layers of one or more thicknesses, through which the water is caused by gravity or pressure, as may be preferred for the conditions in practice, to percolate. The filter-bed is made movable through the employment of spools on which it is rolled in a continuous sheet and then unwound and caused to traverse across the filtering-chamber, preferably on a supporting-table made of wire screen or perforated metal plate, to a receiving-spool, where it is rewound into a roll again as fast as the interstices become filled or clogged with the oil and impurities retained by it from the water flowing or percolating through same during its travel across the filtering-chamber. The movement of the filter-bed in its travel across the filtering zone may be intermittent, or it may be a continuous slow motion and may be driven automatically by mechanical power or by application of hand-power, as may be preferred, the object being to keep the filtering zone supplied with efficient filtering material through displacing therefrom the clogged and filled material without causing interruption to the operation of the filtering in so doing, and thus maintain the efficiency and capacity of the filter with more uniformity in its results and with less expenditure of personal attention, as also with less renewal of filtering material as is now required with filters using sand, hay, sponges, and other like material that soon loses its filtering efficiency with a diminished filtering capacity besides interrupting the operation of the filter in making the frequent renewal of filtering material.

In water-purifying apparatus as heretofore known and in which movable beds of filtering material are employed such beds are generally of the endless or belt type in combination with mechanism provided for removing from such belts the matter extracted from the water filtered. In my herein-described invention I dispense with such mechanism, as also with the endless or belt type of filtering-beds, and instead I use the filtering material in sheets or sections of appropriate lengths rolled on spools located within the confines of the apparatus. Said spools, together with the filtering material thereon accumulated with its body impregnated with the oil, &c., extracted from the water filtered, is bodily removed from the apparatus, and the impregnated filtering material thereon contained is treated to a cleaning process in which steam with or without chemicals is employed for thoroughly removing therefrom the oil that otherwise would remain in the filtering material, which in case of its reuse in the filter would contaminate the filtered water to such a degree as to render it unfit for repeated use as boiler-feed in surface type of marine-engine installations, for which service my said invention is particularly designed. I accomplish this result by the use of the apparatus shown in its simplest form by the accompanying drawings, forming a part of this specification, and in which—

Figure 1 is a vertical longitudinal section of the apparatus on the line A B of Fig. 2. Fig. 2 is a horizontal section of Fig. 1 on the line C D, and Fig. 3 is an external view of the far side of the right-hand end of the apparatus indicated by Figs. 1 and 2.

Similar numerals refer to similar parts throughout the several views.

In the drawings, 4 represents the filter tank or vessel constructed of steel plate or other suitable material. It is provided at the ends, as shown, with spool or roll chambers 5, 6, 7, and 8, and also with the perforated plates 9 and 10, forming the tables for supporting the movable filtering-beds 11 and 12. These filtering-beds are unwound from the spools 13 and 14 and rewound on spools 15 and 16, respectively, as fast as they become filled with oil or other impurities to an extent sufficient to impair their filtering efficiency and capacity.

The filter-beds 11 and 12 are made of towel-crash or other fabric in one or more sheets or layers and for gravity-filters are placed on an incline longitudinally, as shown on the drawings, being held in the proper plane by means of the idlers or guide-rollers 17, 18, 19, and 20. (Shown in the drawings.) In the spool-chambers 5 and 7 these idlers 18 and 19 also serve to prevent a backflow of the oil or other flowing impurities onto the filter-beds in the filtering-chambers as it becomes squeezed out of the fabric through the winding process of it under tension on the spools 15 and 16. This oil, &c., flows into the bottoms of the roll-chambers 5 and 7, from where it is removed from the apparatus through the drain-outlets 23 and 24.

The winding of the filtering fabric or beds 11 and 12 onto the rolls 15 and 16 from the rolls 13 and 14, respectively, is accomplished by means of the hand-cranks 25 and 26, the tension on the beds being attained by the resistance of the counterweights 27 and 28, the engagement of the pawls 29 and 30 with the ratchet-wheels 31 and 32 maintaining such tension.

The roll-chambers 5, 6, 7, and 8 may be provided with removable heads 33 and 34 to permit of the convenient removal of the spools 13, 14, 15, and 16 from their respective chambers whenever so desired for any purpose.

The filtered water is collected in the chamber 35, from where it is removed through the outlet-opening 43 from the apparatus.

In the case of gravity-filters a distributing-nozzle 42 is provided for the impure-water inlet and is located over the highest end of the uppermost filter-bed, as shown on the drawings.

Covered openings 36, 37, 38, 39, 40, and 41 are provided for purposes of inspection, repairs, cleaning, &c., and at such locations as may be found most suitable for the purpose named.

The operation of the apparatus is substantially as follows: The spools 13 and 14 are first filled to their full holding capacity with the sheet-filtering material, the longer the strips obviously the greater the length of time intervening for interrupting the operation of the apparatus for renewal of the rolls with clean material, and their respective ends are attached by any suitable method to the opposite receiving-spools 15 and 16, respectively. The water to be filtered is then conveyed into the apparatus through the inlet-pipe 44 and is distributed over the highest end of the top filter-bed 12 by means of the series of outlet-openings 45, shown in the nozzle 42, for this purpose. The arrows shown in the filtering-chambers indicate the direction and path or course of flow of the water into, through, and from the apparatus.

Under the perforated table 9 is provided an apron 46 for collecting and conveying the water from the filter-bed 12 to the uppermost end of the filter-bed 11, as shown on the drawings. The inclination of the filter-beds causes the water to spread by its own gravity over same. In the case of filters in which the water is caused to pass through the apparatus under pressure the filter-beds need not be inclined nor need they necessarily be horizontal, but may be held by tension or otherwise in a vertical or any other plane as the conditions of installation may make necessary.

It is obvious that the supporting-tables 9 and 10 may be entirely omitted without departing from the essence of my invention by causing the filtering fabric to be held in position by tension alone; but I prefer the arrangement herein shown and described.

Mere details of construction of the apparatus form no part of the real invention, and the same may be modified to suit the convenience of the designer without departing from the essence of my invention, which consists in the use of one or more movable filter-beds, with the necessary appliances for their removal from the filtering zone, and replacing same with fresh or clean filtering material as they become filled with the impurities extracted from the water being filtered without interrupting the operation of the filtering process during such removal and replacing.

Having thus described my said invention, what I claim as new, and desire to secure by Letters Patent, is—

1. A water-purifying apparatus provided with one or more movable filtering-beds the body of the filtering area of which lies in a plane; in combination with removable spools provided with one or more sheets of filtering material; substantially as and for the purpose shown and described.

2. A water-purifying apparatus consisting of a tank or vessel provided with a water-inlet opening; and a filtered-water-collecting chamber having a water-outlet opening, and one or more movable filtering-beds the body of the filtering area of which lies in a plane; in combination with removable spools provided with one or more sheets of filtering material; substantially as and for the purposes shown and described.

3. A water-purifying apparatus consisting of a tank or vessel provided with a water-inlet opening, and a filtered-water-collecting chamber having a water-outlet opening, and one or more movable filtering-beds the body of the filtering area of which lies in a plane; in combination with spools for storage of and giving movement to said beds, said spools being within the confines of said tank and removable therefrom with the accumulated thereon oil-impregnated sheets of filtering material; all substantially as and for the purposes shown and described.

4. A water-purifying apparatus consisting of a tank or vessel provided with a water-inlet opening, and a filtered-water-collecting chamber having a filtered-water-outlet opening, and with one or more movable filtering-beds the body of the filtering area of which lies in a plane and provided with spools for storage of and giving movement to said beds, said spools being within the confines of said tank and removable therefrom with the accumulated thereon oil-impregnated sheets of filtering material; in combination with hand-cranks for revolving said spools, and ratchet-wheels and pawls therewith engaging, in conjunction with counterweights, for maintaining tension on said beds; all substantially as and for the purposes shown and described.

5. A water-purifying apparatus consisting of a tank or vessel 4, provided with inlet-pipe 44, a distributing-nozzle 42, and an outlet-pipe 43, and filtering-chambers 21 and 22, and a water-collecting chamber 35, said filtering and collecting chambers being formed by means of partitions composed of an apron 46, movable filter-beds 11, and 12, resting upon perforated tables 9, and 10; in combination with spool-chambers 5, 6, 7 and 8, containing spools 13, 14, 15 and 16, and idlers or guide-rollers 17, 18, 19 and 20, for storing and traversing said filter-beds; said spools being provided with hand-cranks 25, and 26, for revolving same, and with ratchet-wheels 31, and 32, engaging pawls 29, and 30, for holding said spools in position, and with counterweights 27, and 28, for maintaining tension on said filter-beds; the spool-chambers 5, and 6, being provided with drain-outlets 23, and 24; all substantially as and for the purposes shown and described.

In witness whereof I have hereunto set my hand in the presence of two subscribing witnesses.

JAMES S. MILNE.

Witnesses:
   JAS. NELSON ALEXANDER,
   ROBT. D. KINNEY.